(No Model.)

E. HUBER.
REVOLVING HAY RAKE.

No. 255,291. Patented Mar. 21, 1882.

Witnesses.
Edwin L. Yewell.
J. J. McCarthy.

Inventor.
E. Huber,
by C. M. Alexander
his Attorney.

UNITED STATES PATENT OFFICE.

EDWARD HUBER, OF MARION, OHIO.

REVOLVING HAY-RAKE.

SPECIFICATION forming part of Letters Patent No. 255,291, dated March 21

Application filed November 29, 1881. (No model.)

*To all whom it may concern:*

Be it known that I, EDWARD HUBER, of Marion, in the county of Marion, and in the State of Ohio, have invented certain new and useful Improvements in Revolving Horse Hay-Rakes; and I do hereby declare that the following is a full, clear, and exact description thereof, reference being had to the accompanying drawings, and to the letters of reference marked thereon, making a part of this specification.

This invention relates to horse hay-rakes wherein the teeth are inserted into a head which is allowed to revolve in journal-bearings on the ends of the standards to which the arms or handles are pivoted.

The nature of my invention consists in the combination of spring-plates having catches struck on their free ends and fixed to the arms or handles with engaging-plates applied to the revolving rake-head and the teeth thereof for the purpose of holding the rake in a working position for gathering a load and allowing the attendant to release the rake for discharging the loads, as will be hereinafter explained.

Figure 1:
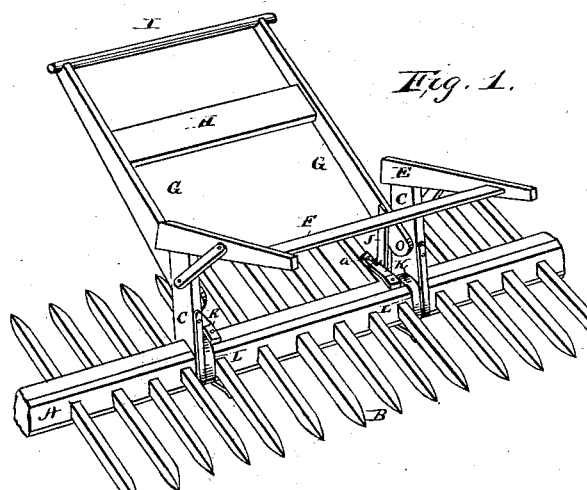
Figure 2:
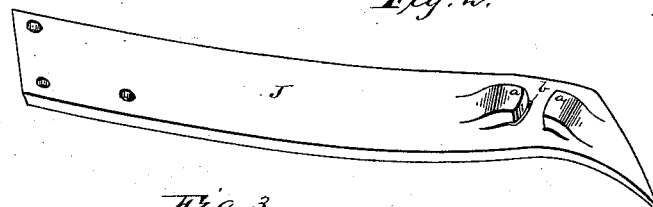
Figure 3:
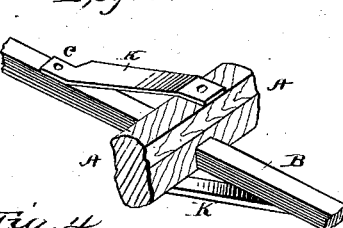
Figure 4:
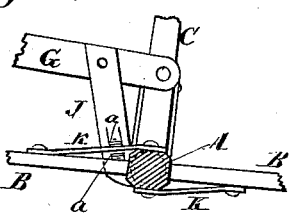

In the annexed drawings, Figure 1 is a perspective view of the rake held in working position by the spring-catches. Fig. 2 is a perspective view of one of the spring-catches. Fig. 3 is a perspective view of a portion of the rake-head and two teeth, showing the shoes K. Fig. 4 is a transverse section in detail.

A is the rake-head, and B the rake-teeth, which are of the ordinary construction. The lower ends of the vertical standards C are secured to the rake-head A by proper straps and in such a manner that the head will freely revolve in said straps. To the tops of these standards C are secured the draft-bars E, which are connected together by the cross-tie E. About midway between the draft-bars E and the head A are pivoted the handles G, which are secured together by a cross-tie, H, and provided with a handle, I. The metal springs J are provided with catches *a*, which are struck or punched directly out of the springs. These springs are rigidly secured at their upper ends to the handles G, so that their lower ends project downward for the purpose of allowing the space *b* between the catches *a* to engage with the edges of the plates K, which are secured to the rake-head A and to proper teeth. The bottoms of these springs are rounded off and the front edges curved forward, as shown in Fig. 2, so as to conform with and fit closely to the bands L, which are secured to and encircle the rake-head. These plates K are so arranged upon their proper teeth and rake-head, as shown in Fig. 3, that they serve as shoes.

In the operation of this rake the draft of the team has a tendency to throw to the ground those ends of the rake-teeth which are presented to the front. When the operator desires to unload that side of the rake, by revolving the same he slightly raises the rear ends of the handles, which causes the springs J to slide backward upon the upper faces of the plates K until they pass to the notches *c*, when the rake revolves, the lower ends of the springs J sliding against the bands L as the rake revolves until the revolution is complete, when the projections *a* will again engage with similar plates, K, upon the opposite side of the head.

The advantages of my construction are as follows, viz: By making the plates K serve as shoes I save considerable expense, and by punching the stops *a* on the springs J, I obtain stronger detents, which will not get clogged, as was the case in my rake patented to me January 24, 1865, No. 46,001. By curving the ends of the springs J, I am able to fit them more closely to the head, thus avoiding danger of clogging, and by combining with it the band L the rake revolves with less friction and wear.

It will be seen that when the operator lifts the arms for the purpose of discharging a load the lower lug *a* will act directly on a plate K and tilt the rake at once.

What I claim is—

1. The combination, in a revolving rake, of the rake-head A, revolving in the standards C, the plates K, notched at *c* and secured to the rake-head and tines, the handles G, pivoted to the standards C, the springs J, secured to said handles, and the two lugs or projections *a a* on said springs, one projection serving to hold down the rake-teeth in working position and the other projection serving as a lifter, substantially as described.

2. The combination of the rake-head adapted to revolve in bearings of standards C, the metal bands L, encircling the rake-head, the spring catch-plates J, and the plates K, bearing against said bands, substantially as specified.

3. For a horse hay-rake of the character described, a curved spring, J, provided near its curved end with two catches, a a, adapted for use in combination with the plate K, notched to at c, for the purpose described.

In testimony whereof I affix my signature, in presence of two witnesses, this 17th day of November, 1881.

EDWARD HUBER.

Witnesses:
C. H. NORRIS,
J. E. DAVIDS.